Figure 1:
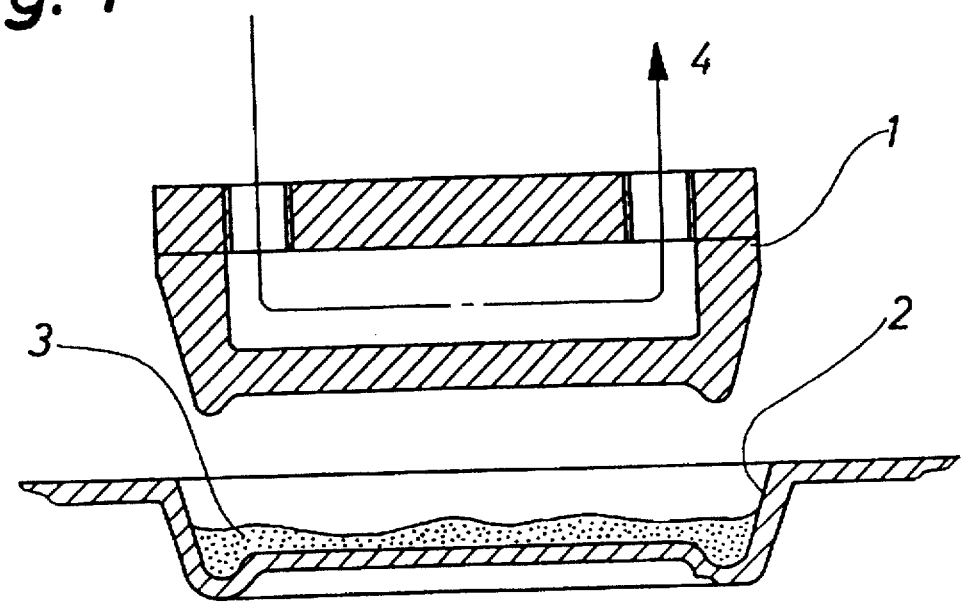

United States Patent [19]

Aasted

[11] Patent Number: 5,705,217
[45] Date of Patent: Jan. 6, 1998

[54] METHOD AND A SYSTEM FOR THE PRODUCTION OF CHOCOLATE ARTICLES

[75] Inventor: Lars Aasted, Charlottenlund, Denmark

[73] Assignee: Aasted-Mikroverk ApS, Farum, Denmark

[21] Appl. No.: 724,855

[22] Filed: Oct. 3, 1996

Related U.S. Application Data

[63] Continuation of Ser. No. 124,458, Sep. 22, 1993, abandoned.

[30] Foreign Application Priority Data

Sep. 23, 1992 [DK] Denmark .......................... 1178/92

[51] Int. Cl.$^6$ .......................................... A23G 1/21
[52] U.S. Cl. .......................... 426/512; 426/514; 426/515; 425/292
[58] Field of Search .................. 426/414, 512, 426/514, 515, 279, 281, 390, 391, 93; 425/292

[56] References Cited

U.S. PATENT DOCUMENTS

| | | | |
|---|---|---|---|
| 1,069,509 | 8/1913 | Winn | 425/292 |
| 1,260,074 | 3/1918 | Sebring et al. | 425/292 |
| 1,647,944 | 11/1927 | Villasenor | 425/216 |
| 1,856,153 | 5/1932 | Borg | 426/515 |
| 2,123,215 | 7/1938 | Thomas | 426/279 |
| 2,156,145 | 4/1939 | CaVett et al. | 426/514 X |
| 2,833,654 | 5/1958 | Sonnensheim et al. | 426/512 X |
| 3,045,284 | 7/1962 | Teras | 425/292 X |
| 4,076,207 | 2/1978 | Austin | 426/515 |
| 4,200,658 | 4/1980 | Katzman et al. | 426/512 |
| 4,421,773 | 12/1983 | Akutagawa | 426/512 X |
| 4,426,402 | 1/1984 | Kaupert | 426/515 |

FOREIGN PATENT DOCUMENTS

| | | |
|---|---|---|
| 1549992B | 1/1989 | Denmark . |
| 122020 | 7/1901 | Germany . |
| C860446 | 12/1932 | Germany . |
| C614710 | 5/1935 | Germany . |
| U1441 | 11/1955 | Germany . |
| 11180613 | 10/1964 | Germany . |
| 207974 | 12/1923 | United Kingdom . |
| 996995 | 6/1965 | United Kingdom . |
| 1483614 | 8/1977 | United Kingdom . |
| 9315613 | 8/1993 | WIPO ............................ 426/515 |

OTHER PUBLICATIONS

European Search Report.

*Primary Examiner*—Milton Cano
*Attorney, Agent, or Firm*—Finnegan, Henderson, Farabow, Garrett & Dunner, L.L.P.

[57] ABSTRACT

A method for producing chocolate articles having an outer shell (5) of solid chocolate, wherein a mould cavity (2) is filled with a tempered chocolate mass (3). Then a "supercooled" cooling member (1) is immersed into the chocolate mass (3) and lifted clear of it again after a residence time of 2 to 3 seconds. The produced chocolate shells (5) have a completely uniform wall thickness and an accurately predetermined shell volume.

10 Claims, 2 Drawing Sheets

METHOD AND A SYSTEM FOR THE PRODUCTION OF CHOCOLATE ARTICLES

This application is a continuation of application Ser. No. 08/124,458, filed Sep. 22, 1993, now abandoned.

The present invention concerns a method for producing outer shells of fat-containing, chocolate-like masses in particular for chocolate articles, wherein a mould cavity is filled with a tempered chocolate-like mass which, under crystallisation, solidifies from the mould cavity and inwardly to form the outer shape of the shell, the temperature of the mould cavity being lower than the temperature of the tempered mass.

Methods of this type are known wherein the mould cavity has to be filled with a tempered chocolate mass in an amount which is at least twice as large as the amount required for the finished chocolate shell. After the tempered chocolate mass has been filled into the mould cavity, the mould cavity is shaken for a subsequent period of time during which the chocolate mass solidifies under crystallisation from the mould cavity and inwardly. Then the mould cavity is inverted, and the excess chocolate mass is shaken out of the solidified shell-forming chocolate mass in the immediate vicinity of the mould cavity and is collected to be tempered and used again in the manufacturing process. When the shell has obtained a "leather-like" consistency during its solidification, the excess chocolate amount at the upper annular edge of the shell can be cut off. The chocolate shell can subsequently be filled with a center, e.g. in the form of cremes or the like before it is removed from the mould cavity after having solidified completely.

The obtained thickness and uniformity of the shell produced depends completely on the prepared state and thus viscosity of the chocolate as well as on how long the mould cavity is shaken and on how uniform the heat release of the chocolate to the mould cavity is. The prepared state of the chocolate depends in particular upon how finely and uniformly the cocoa beans have been prepared as well as on the fat content of the mass. Before the chocolate mixture is filled into the mould cavity, it must be tempered within a very limited temperature range between 27° C. and 32° C. to avoid undesirable crystal growth in the mixture. The viscosity of the chocolate mixture in the tempered state depends mainly on the composition of the mixture and thus on the fat content. A relatively high content of fat is therefore frequently necessary for the desired viscosity to be obtained.

In these known methods it is therefore impossible to use "fat-poor" chocolate mixtures because these are still highly viscous after tempering and simply cannot run out of the mould cavity in sufficient amounts when this is inverted. It should also be mentioned that it is inexpedient to manufacture chocolate shells having a content of ingredients.

Chocolate shells produced by the said known methods therefore frequently vary greatly in thickness and uniformity, so that it is difficult to determine the total chocolate consumption accurately. At the same time the methods involve high tempering costs because of the large amount of excess chocolate mass which is constantly in circulation and has to be tempered again.

The method of the present invention for producing outer shells of fat-containing chocolate-like masses in particular for chocolate articles is characterized in that a cooling member having a temperature lower than 0° C. is immersed into the mass immediately after this has been filled into the mould cavity and is kept in the mass in a completely immersed position for a predetermined period of time to define a predetermined shell volume between said member and the mould cavity. The advantage of this is that the prepared state of the chocolate and in particular its viscosity during tempering have no importance for the consumed amount of chocolate-like mass, which makes it possible to produce chocolate shells having a completely uniform shell thickness and volume.

The mould cavity is filled with a chocolate-like mass in an amount which is just slightly, preferably only 10%, larger than the volume of the finished shell. Then the cooling member, which has preferably been cooled to −15 to −30° C., is immersed into the chocolate mass and is kept in a fully immersed position in it, preferably for about 2-3 seconds. The chocolate-like mass will then solidify rapidly during crystallisation from the cooling member and outwardly and will readily release the cooling member, which can be lifted up and out of the mould cavity. The shell can then be further processed.

The invention also concerns an apparatus for use in the performance of the method for producing the shells, said apparatus comprising a mould cavity to receive a tempered chocolate-like mass, said mould cavity having a shape corresponding to the outer shape of the finished shell and being adapted to be kept at a temperature which is lower than the temperature of the tempered chocolate-like mass.

The apparatus of the invention is characterized in that it moreover comprises a cooling member having an outer shape corresponding to the inner shape of the finished shell, and that the cooling member is adapted to be cooled to a temperature lower than 0° C. and to be immersed into the chocolate-like mass and be kept in it in a fully immersed position for a predetermined period of time to define a predetermined shell volume between said member and the mould cavity.

According to the invention the apparatus may comprise knife means for cutting off the excess amount at the upper annular edge of the shell.

Finally, according to the invention, the external face of the cooling member may be provided with depressions or recesses to form corresponding elevations, such as in the form of ribs, partitions or text on the internal face of the shell.

Figure 2:
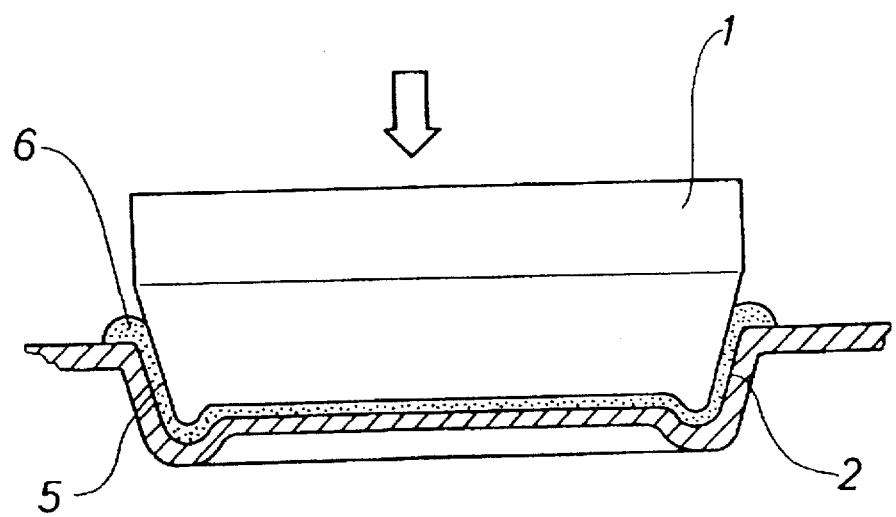
Figure 3:
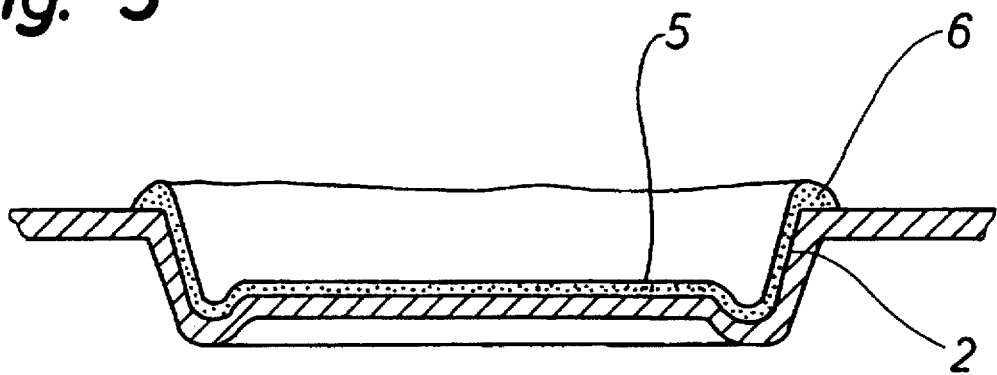
Figure 4:
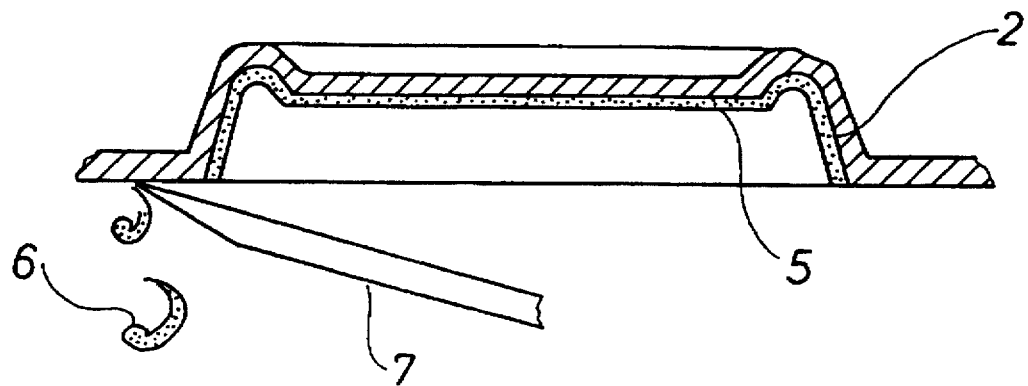
Figure 5:
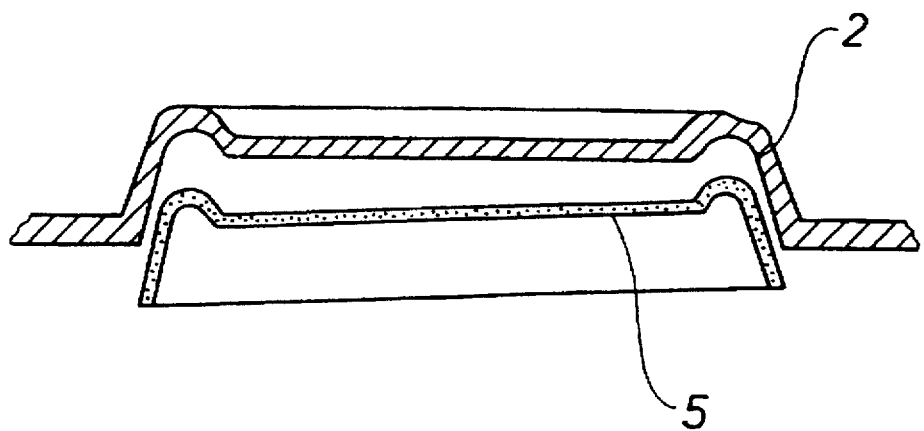

The invention will be explained more fully below with reference to a particularly preferred embodiment as well as the drawing, in which FIG. 1 is a lateral schematical cross-sectional view through a cooling member and an underlying mould cavity filled with a chocolate mass, FIG. 2 is a view of the same, with the cooling member immersed in the chocolate mass, FIG. 3 is a view of the same, with the cooling member again lifted up and out of the mould cavity, FIG. 4 is a view of the same, with the mould cavity inverted, and the excess chocolate mass being cut off, and FIG. 5 is a view of the same, with the chocolate shell being ejected from the mould cavity.

The cooling member 1 shown in FIG. 1 is shaped as a male part having an outer shape which e.g. corresponds with the inner shape of an underlying mould cavity 2. The mould cavity 2 is just one of many cavities in a mould plate which is preferably made of hard polycarbonate. For clarity, only one mould cavity is shown in the form of a mould plate and one overlying cooling member 1 which are involved in the system, which, of course comprises many cooling members and underlying mould plates, which are either continuously moved past below the cooling members and are kept stationary when the chocolate shells are moulded, or which are advanced synchroneously with the cooling members. The system comprises means for controlling the up and down movement of the cooling members as well as residence times in the fully immersed position in the mould cavities 2 as well as means for controlling the advancing movements of the mould plates. The arrangement of the male part in the lower position can be adjusted.

The cooling members 1 moreover comprise means adapted to cool the cooling members 1 to a so-called supercooled state at a temperature about −15° C. to −30° C. Before the chocolate mass is filled into the mould cavities 2, the mass is tempered to a temperature between 27° C. and 32° C., according to the composition of the mass and with a view to avoiding undesirable crystal growth in the mass at a too early moment. The mould cavity 2 is kept at a temperature which is lower than the temperature of the chocolate mass, and preferably about 15° C. to 25° C.

The chocolate mass is filled into the mould cavity in an amount which just has a volume that is typically about 10% larger than the volume of the finished chocolate shell.

Then, as shown in FIG. 2, the cooling member 1 is lowered down into the chocolate mass 3 to a fully immersed position to define the predetermined shell volume between said member 1 and the mould cavity 2. The small excess amount of chocolate spreads along the upper edge 6 of the shell 5. The chocolate mass 3 rapidly solidifies under crystallisation from the outer surface of the cooling member and outwardly in the chocolate shell 5. The cooling member 1 is kept in the fully immersed position typically for about 2 to 3 seconds and is then lifted up again and out of the mould cavity 2 when producing shells for chocolate articles, such as pralines. However, the residence time may vary from about 1 second and up to 10 seconds, according to the shape and size of the shell as well as the prepared state of the chocolate mass.

A conical chocolate shell having a weight of 17 g and a thickness of 5 mm was moulded in a test with a residence time of 3 seconds, a flat, rectangular chocolate shell having a weight of 9 g and a thickness of 4 mm was moulded with a residence time of 2 seconds, and finally a chocolate shell for a praline having a shell weight of 2 g and a thickness of 2 mm was moulded with a residence time of 2 seconds. The temperature of the cooling member was −25° C. for all three mouldings.

The mould plate with the moulded mould cavities 2 can now be moved further on for after-treatment of the chocolate shells 5, and, as shown in FIG. 4, the mould plate is turned bottom up, and the excess chocolate volume of the individual chocolate shell 5 at the annular edge of the shell is cut off by a knife 7 when the chocolate mass has solidified to a "leather-like" consistency. The small amount of excess chocolate mass is collected and recycled for renewed tempering and reuse in the process.

As shown in FIG. 5, the finished chocolate shell 5 can then be released from the mould cavity 2 when it has solidified sufficiently.

The original prepared state of the chocolate and in particular the viscosity after tempering have no importance for the consumed amount of chocolate mass, and the chocolate shells produced according to the invention have a completely uniform shell thickness and a well-defined volume. Like in many other modern production processes it is therefore a great advantage that the consumption of chocolate mass can be determined accurately, and that just a small excess amount of chocolate mass enters into the recycle mode of the process and has to be heated again by tempering, such that also the tempering capacity and the costs of it are reduced considerably with respect to what was necessary in the past. It is simultaneously a great advantage that it is possible to work with fat-poor chocolate mass mixtures which, as is well-known, have a high viscosity owing to a small content of fat.

It should also be mentioned that the mould plates can be inverted again before the chocolate shells are expelled again with a view to after-treatment, where the chocolate shells are e.g. filled with creme. It is also conceivable that various types of centres can be deposited in the chocolate shell, since this may be divided by means of ribs or partitions, which are formed in that the cooling member may be provided with recesses or grooves. It is also conceivable that the cooling member is exteriorly provided with elevations which form embossings or text in the internal face of the shell. Finally, it is conceivable that the shell is filled with a chocolate mass amount of another chocolate type, and that a smaller cooling member is immersed in this to form an internal coating on the internal surface of the chocolate shell.

The method of the invention may be used in connection with the production of many types of articles which comprise an outer shell of a chocolate-like mass. The method is particularly advantageous in connection with the production of chocolate articles having a large inner cavity with a visible inner surface, such as Easter eggs. But the method is also advantageous for the production of chocolate articles which are to be provided with a centre.

I claim:

1. A method of producing outer shells of fat-containing chocolate, which comprises the steps of:

filling a mould cavity with a mass of tempered chocolate, the temperature of the mass sufficient to avoid undesirable crystal growth, and the temperature of the mould cavity being lower than the temperature of the tempered chocolate;

immediately after the mould cavity has been filled, lowering a cooling member having a temperature lower than 0° C. into the mass of tempered chocolate in the mould cavity to a fully immersed position to define a predetermined shell volume between the cooling member and the mould cavity; and maintaining the cooling member at said temperature in the fully immersed position for a predetermined period of time and solidifying the chocolate mass rapidly during crystallization outwardly from the outer surface of the cooling member to thereby form a chocolate shell which readily releases the cooling member after forming said shell.

2. A method according to claim 1 wherein the cooling member is kept for 1 to 10 seconds in the chocolate mass in the fully immersed position and is then lifted clear of the mould cavity.

3. A method according to claim 1, wherein the mould cavity is filled with the tempered chocolate mass having a volume which is 10% larger than the predetermined shell volume.

4. A method according to claim 1 or 3, wherein excess chocolate at an annular edge of the chocolate shell is cut off after the chocolate mass has solidified.

5. The method of claim 1, wherein the temperature of the mould cavity is from about 15° C. to 25° C. and the temperature of the cooling member is from about −15° C. to −30° C.

6. A method according to claim 5, wherein the cooling member is kept for 2 to 3 seconds in the chocolate mass in the fully immersed position and is then lifted clear of the mould cavity.

7. Apparatus for producing outer shells of fat-containing chocolate, which comprises:

a plurality of mould cavities, each for receiving a mass of tempered chocolate and having an inner surface with a shape corresponding to an outer shape of a shell to be produced and maintained at a temperature lower than the temperature of the tempered chocolate mass;

a plurality of cooling members, each having an outer surface with a shape corresponding to an internal shape of a shell to be produced, and cooled to a temperature lower than 0° C. for immersion in a mass of tempered chocolate, immediately after being filled in a corresponding mould cavity, at a fully immersed position and to be maintained in the fully immersed position for a predetermined time to solidify the chocolate mass during crystallization outwardly from the outer surface of the cooling member to thereby form a chocolate shell which readily releases the cooling member after forming said shell; and means for controlling the vertical movement of the cooling members as well as residence times of the cooling members in the fully immersed positions.

8. Apparatus according to claim 7, wherein the cooling member is adapted to be cooled to a temperature between −30° C. and 0° C. and is adapted to have a predetermined residence time in the fully immersed position.

9. Apparatus according to claim 7 or 8, further including knife means for cutting off chocolate at an annular edge of a shell produced.

10. Apparatus according to claim 7, wherein the outer surface of the cooling member is provided with depressions or recesses for forming corresponding elevations on the internal shape of a produced shell.

* * * * *